United States Patent Office 2,795,509
Patented June 11, 1957

2,795,509

PROCESS FOR THE STABLE DISPERSION OF SILICON DIOXIDE IN SOLUTIONS OF CELLULOSE ETHERS

Ernest Ferdinand Zaalberg van Zelst, Nimeguen, Netherlands, assignor to Kunstzijdespinnerij Nyma N. V., Nimeguen, Netherlands, a limited liability company of the Netherlands No Drawing. Application December 1, 1953,
Serial No. 395,624

Claims priority, application Netherlands
December 9, 1952

13 Claims. (Cl. 106—193)

The invention provides a process to obtain a mixture of a cellulose ether, e. g. sodium carboxy methyl cellulose and $SiO_2$, and more particularly to a process of preparing a stable $SiO_2$ dispersion in aqueous cellulose ether solutions. If commercial colloidal $SiO_2$ solutions are added to sodium carboxy methyl cellulose, the colloidal $SiO_2$ particles easily coagulate and settle down. Moreover the use of these special $SiO_2$ solutions is expensive due to the rather complicated manner in which these are to be prepared. In the process according to the invention the separate preparation of colloidal $SiO_2$ solutions is entirely avoided, while the $SiO_2$ dispersion obtained is completely stable.

The invention furthermore comprises a process for sizing yarns, consisting herein that the sizing is carried out with the above mentioned stable dispersion of $SiO_2$ in a solution of a cellulose ether.

In accordance with the invention, the cellulose ether, i. e. sodium carboxy methyl cellulose is prepared in conventional manner and during one of the stages of preparation of the sodium carboxy methyl cellulose an alkaline solution of a silicate is added to the reaction mixture and thereupon neutralization with acid, preferably a non-oxidizing acid having a hydrogen ion concentration of not less than $1.753 \times 10^{-5}$, takes place.

The alkaline silicate solution may be added and thereupon the alkali of the reaction mixture as well as that of the silicate solution may be neutralized simultaneously. If desired the alkaline silicate solution may also be added to the already neutralized reaction mixture.

If one wants to liberate the neutralized $SiO_2$ containing reaction mixture from the admixed salts, the mixture may be purified in the usual manner by extraction with alcohol. It is also possible to obtain more immediately a purified product by extracting the reaction mixture with acidified alcohol before the neutralization.

The invention is not restricted to obtaining stable $SiO_2$ dispersions in a sodium carboxy methyl cellulose solution, but provides for all cases in which one wants to disperse $SiO_2$ in a stable manner in solutions of cellulose ethers, such as carboxyalkyl-, hydroxyalkyl- and alkylcelluloses. The invention is further elucidated by the following examples:

*Example I*

To 644 g. of soda cellulose in crumbled form, containing approximately 30% of cellulose and approximately 15% of NaOH, 166 g. of $CH_2ClCOONa$ were added. The mixture obtained in this manner was ground during 6 hours in a laboratory mill of the Werner-Pfleiderer type. Thereupon 272 g. of waterglass containing 35% of $SiO_2$ and 17% of $Na_2O$ were added. The mass was neutralized with acetic acid and dried.

The mixture obtained contained 13% of $SiO_2$ and 31% of sodium carboxy methyl cellulose (CMC) or 15 parts of $SiO_2$ besides 100 parts of technical CMC. The stability of a 1% solution of this mixture was compared with a 1% solution of the same CMC prepared in the same manner, but without the addition of waterglass to which a commercial colloidal $SiO_2$ solution was added namely 15 parts of $SiO_2$ per 100 parts of technical CMC.

The stability of the various dispersions appears from the following:

|  | Point of time at which the settling of $SiO_2$ particles can be clearly observed |
|---|---|
| 1% solution of a mixture of 100 parts of CMC and 15 parts of $SiO_2$ according to the invention. | 7 days after the preparation of the solution. |
| 1% solution of a mixture of 100 parts of CMC and 15 parts of $SiO_2$, added in the form of a colloidal $SiO_2$ solution from the market. | 2 hours after the preparation of the solution. |

The favorable behavior of the solution of the $SiO_2$-CMC mixture according to the invention was found also when the settling test was carried out at 90° C.

*Example II*

In the same manner as indicated in Example I a dried $SiO_2$ containing CMC was prepared and thereupon extracted with 60% aqueous ethanol and thereupon dried again. From the dried and purified product thus obtained a 1% dispersion was made and compared in the same manner as indicated in Example I in respect of the stability with a 1% solution of CMC prepared and purified in the same manner—but without the addition of waterglass to which a colloidal dispersion containing only $SiO_2$ and water was added in such a quantity that 15 parts of $SiO_2$ were present to 31 parts of pure CMC. The clear settling down of the $SiO_2$ could be observed in the former dispersion after 7 days, in the latter dispersion after 4 hours.

*Example III*

In the same manner as indicated in Example I CMC was prepared followed by the addition of waterglass. The mixture thus obtained was suspended in 60% aqueous ethanol containing moreover a measured quantity of strong HCl, necessary to neutralize the NaOH of the soda cellulose and of the waterglass. After centrifugation and drying a purified $SiO_2$-containing CMC was obtained which was tested in the same manner as indicated in Example II. In this test of the stability of the dispersion the same results as indicated in Example II were found.

*Example IV*

Woolen yarn No. 20 (metric number) was sized with a $SiO_2$ dispersion in a solution of sodium carboxy methyl cellulose prepared according to Example I (5% solution of the technical CMC-$SiO_2$ mixture). The sized yarn had a tensile strength of 285 g. while the strength of the non-sized yarn was 221 g. The elongation of the sized yarn was 17.9%, of the non-sized yarn 10.5%. The weavability of the yarn was excellent. Not only the number of warp breakage was considerably reduced but also slipping of knots was eliminated.

What is claimed is:

1. A process for preparing a mixture of a cellulose ether selected from the group consisting of lower carboxyalkyl, lower hydroxyalkyl and lower alkyl cellulose, and particulate $SiO_2$, comprising the steps of adding a waterglass solution to the cellulose ether and neutralizing the mixture with a non-oxidizing acid having a hydrogen ion concentration of not less than $1.753 \times 10^{-5}$.

2. A process of preparing a mixture of sodium carboxy methyl cellulose and particulate $SiO_2$, comprising the steps of adding a waterglass solution to the sodium carboxy methyl cellulose and neutralizing the mixture with a non-oxidizing acid having a hydrogen ion concentration of not less than $1.753 \times 10^{-5}$.

3. A process for preparing a mixture of a cellulose ether selected from the group consisting of lower carboxyalkyl, lower hydroxyalkyl and lower alkyl cellulose, and particulate $SiO_2$, comprising the steps of reacting alkali cellulose with $CH_2ClCOONa$, adding waterglass to the reaction product, and further adding a non-oxidizing acid having a hydrogen ion concentration of not less than $1.753 \times 10^{-5}$ to neutralize the reaction mixture.

4. A process for preparing a mixture of a cellulose ether selected from the group consisting of lower carboxyalkyl, lower hydroxyalkyl and lower alkyl cellulose, and particulate $SiO_2$, comprising the steps of reacting alkali cellulose with $CH_2ClCOONa$, adding waterglass to the reaction product, and further adding an aqueous acidified alcohol having a hydrogen ion concentration of not less than $1.753 \times 10^{-5}$ to the mixture to neutralize the same and extract admixed salts therefrom.

5. A process for preparing a mixture of a cellulose ether selected from the group consisting of lower carboxyalkyl, lower hydroxyalkyl and lower alkyl cellulose, and particulate $SiO_2$, comprising the steps of reacting alkali cellulose with $CH_2ClCOONa$, adding waterglass to the reaction product, further adding a non-oxidizing acid having a hydrogen ion concentration of not less than $1.753 \times 10^{-5}$ to neutralize the reaction mixture, and treating the neutralized mixture with aqueous alcohol to extract admixed salts therefrom.

6. A process for preparing a stable dispersion of particulate $SiO_2$ in a solution containing a cellulose ether selected from the group consisting of lower carboxyalkyl, lower hydroxyalkyl and lower alkyl cellulose, comprising the steps of admixing alkali cellulose, an etherifying agent and a waterglass solution, the alkali cellulose and the etherifying agent reacting to form the cellulose ether, neutralizing the mixture with a non-oxidizing acid having a hydrogen ion concentration of not less than $1.753 \times 10^{-5}$, drying the neutralized mixture, and dissolving the dried mixture in water.

7. A process for preparing a stable dispersion of particulate $SiO_2$ in a solution containing sodium carboxy methyl cellulose, comprising the steps of admixing alkali cellulose, an etherifying agent and a waterglass solution, the alkali cellulose and the etherifying agent reacting to form the sodium carboxy methyl cellulose, neutralizing the mixture with a non-oxidizing acid having a hydrogen ion concentration of not less than $1.753 \times 10^{-5}$, drying the neutralized mixture, and dissolving the dried mixture in water.

8. A process for preparing a stable dispersion of particulate $SiO_2$ in a solution containing a cellulose ether selected from the group consisting of lower carboxyalkyl, lower hydroxyalkyl and lower alkyl cellulose, comprising the steps of admixing alkali cellulose, an etherifying agent and a waterglass solution, the alkali cellulose and the etherifying agent reacting to form the cellulose ether, neutralizing and extracting admixed salts from the mixture with an aqueous acidified alcohol having a hydrogen ion concentration of not less than $1.753 \times 10^{-5}$, drying the neutralized mixture, and dissolving the dried mixture in water.

9. A process for preparing a stable dispersion of particulate $SiO_2$ in a solution containing a cellulose ether selected from the group consisting of lower carboxyalkyl, lower hydroxyalkyl and lower alkyl cellulose, comprising the steps of admixing alkali cellulose, an etherifying agent and a waterglass solution, the alkali cellulose and the etherifying agent reacting to form the cellulose ether, neutralizing the mixture with a non-oxidizing acid having a hydrogen ion concentration of not less than $1.753 \times 10^{-5}$, extracting admixed salts from the neutralized mixture with an aqueous alcohol, drying the mixture, and dissolving the dried mixture in water.

10. A stable dispersion of particulate $SiO_2$ in a cellulose ether selected from the group consisting of lower carboxyalkyl, lower hydroxyalkyl and lower alkyl cellulose, comprising an aqueous solution of a neutralized reaction product of the cellulose ether with water-glass and a non-oxidizing acid having a hydrogen ion concentration of not less than $1.753 \times 10^{-5}$.

11. A stable dispersion of particulate $SiO_2$ in sodium carboxy methyl cellulose, which contains about 13% of $SiO_2$ and 31% of the carboxy methyl cellulose, comprising an aqueous solution of a neutralized reaction product of the carboxy methyl cellulose with waterglass and a non-oxidizing acid having a hydrogen ion concentration of not less than $1.753 \times 10^{-5}$.

12. A stable dispersion of particulate $SiO_2$ in a cellulose ether selected from the group consisting of lower carboxyalkyl, lower hydroxyalkyl and lower alkyl cellulose, comprising essentially 99 parts of water and 1 part of a neutralized reaction product of the cellulose ether with waterglass and a non-oxidizing acid having a hydrogen ion concentration of not less than $1.753 \times 10^{-5}$.

13. A textile yarn of improved tensile strength sized with a stable dispersion as defined in claim 10.

References Cited in the file of this patent

UNITED STATES PATENTS

| | | |
|---|---|---|
| 2,086,729 | Moss | July 13, 1937 |
| 2,433,833 | Auer | Jan. 6, 1948 |
| 2,649,388 | Wills | Aug. 18, 1953 |